United States Patent
MacManus

Patent Number: 5,080,035
Date of Patent: Jan. 14, 1992

[54] INSTRUMENT POINTER ATTACHING DEVICE

[75] Inventor: Daniel C. MacManus, Owosso, Mich.

[73] Assignee: Delco Electronics Corporation, Kokomo, Ind.

[21] Appl. No.: 640,780

[22] Filed: Jan. 14, 1991

[51] Int. Cl.⁵ .................................. G01D 13/22
[52] U.S. Cl. ............................ 116/328; 116/332
[58] Field of Search .................. 116/327–332; 368/228, 238; 324/154 PB

[56] References Cited

U.S. PATENT DOCUMENTS

| 52,849 | 2/1866 | Hastings | 116/332 |
| 1,840,039 | 1/1932 | Joyce | |
| 3,130,705 | 4/1964 | Ingham | 116/328 |
| 4,132,188 | 1/1979 | Gjertsen | 116/332 |
| 4,723,504 | 2/1988 | Griffin et al. | 116/332 |
| 4,768,461 | 9/1988 | Knietzsch et al. | 116/328 |
| 4,858,210 | 8/1989 | Yamada et al. | 368/238 |

FOREIGN PATENT DOCUMENTS

| 2744149 | 4/1979 | Fed. Rep. of Germany | 368/238 |
| 2594540 | 9/1987 | France | 116/328 |
| 0660932 | 11/1951 | United Kingdom | 368/238 |

Primary Examiner—William A. Cuchlinski, Jr.
Assistant Examiner—W. Morris Worth
Attorney, Agent, or Firm—Ronald L. Phillips

[57] ABSTRACT

An instrument pointer attaching device has a hub with flat internal side walls that deflect outward in establishing a press fit with a spindle while also acting to limit the assembly force.

3 Claims, 1 Drawing Sheet

INSTRUMENT POINTER ATTACHING DEVICE

TECHNICAL FIELD

This invention relates to instrument pointer attachment devices and more particularly to those employing a press fit.

BACKGROUND OF THE INVENTION

In instruments such as a motor vehicle speedometer and odometer and the like that have a pointer that must be attached to the end of a rotary spindle or shaft, it is common practice to employ a press fit between a hub on the pointer and a projecting end of the spindle. While this has generally proven satisfactory, there are applications where the assembly force for the press fit can rise to a level that exceeds the load bearing ability of the spindle support structure such as where plastic bobbins are employed. One solution has been to very closely control the press fit tolerances but this can be costly if not impractical for high volume production. Another solution has been to limit the assembly force but then there can occur a less than adequate press fit.

SUMMARY OF THE INVENTION

The present invention offers a very simple, low cost solution in the form of a press fit assemblage that assures that the assembly force will not exceed a predetermined acceptable level while establishing the desired press fit (torque capacity). This is accomplished with a hub that is fixed to the pointer and has a plurality of contiguous flat side walls of uniform thickness defining a hollow equilateral cross section for receiving a projecting cylindrical end of the spindle. The hub walls have a thickness and both an axial and radial relationship with the spindle end so that the walls are deflected radially outward only to a predetermined amount on insertion of the spindle end to a predetermined depth in the hub extending past and clear of these walls. The hub walls thus limit the force required to press the hub on the spindle while also cooperating to retain the hub on the spindle end with a predetermined press fit.

It is therefore an object of the present invention to provide a new and improved press fit assembly for attaching an instrument pointer to a spindle.

Another object is to provide a press fit assembly for attaching an instrument pointer to a spindle that in itself limits the force required to effect the desired degree of press fit.

Another object is to provide a pointer to spindle attaching device comprising a hub that is fixed to the pointer and has flat side walls of uniform thickness that deflect on spindle insertion to establish a predetermined press fit between the pointer and spindle while limiting the assembly force that is required to effect this fit.

These and other objects, features and advantages of the present invention will become more apparent from the following description and drawing.

DESCRIPTION OF THE PREFERRED EMBODIMENT

Figure 1:
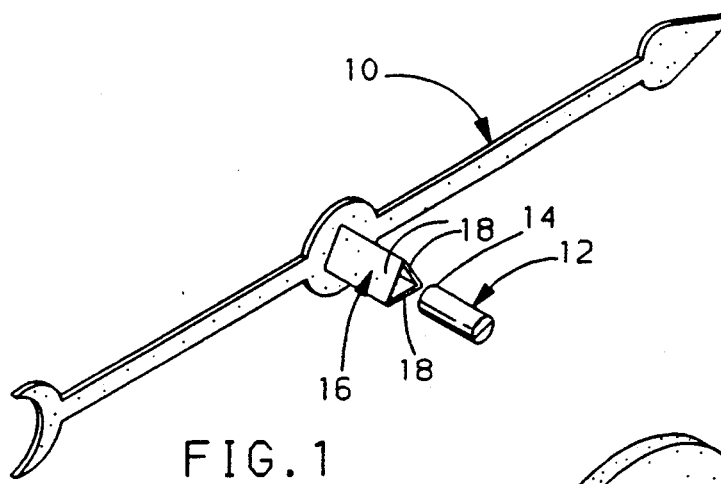
FIG. 1 is an exploded three dimensional view of the pointer to spindle attaching device according to the present invention.
Figure 2:
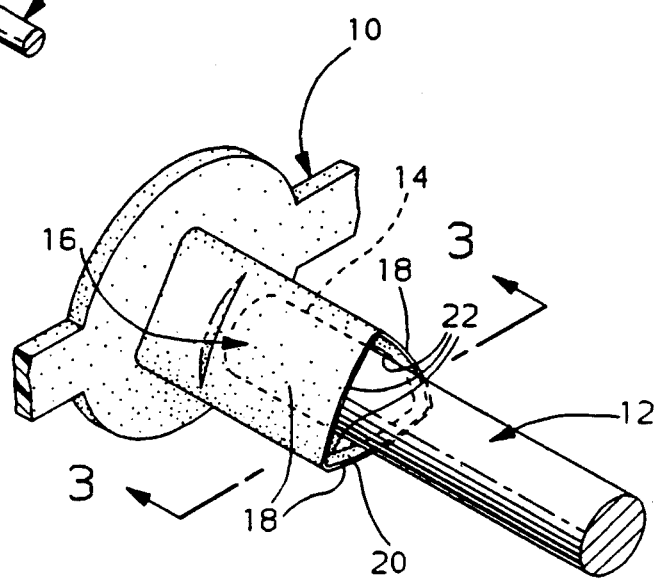
FIG. 2 is an enlarged three dimensional view of the attaching device in FIG. 1 when assembled.

There is shown in FIGS. 1 and 2 a pointer 10 that attaches to a spindle 12 of a conventional motor vehicle speedometer whose remaining parts have been omitted from the drawing. The end 14 of the spindle that projects from the speedometer mechanism is typically cylindrical as shown for attachment to the pointer with a press fit. Such attachment is provided by a hub 16 that is fixed to the pointer at a point intermediate its length. In the embodiment shown, the hub and pointer are integrally formed as a single plastic molded part.

Figure 3:
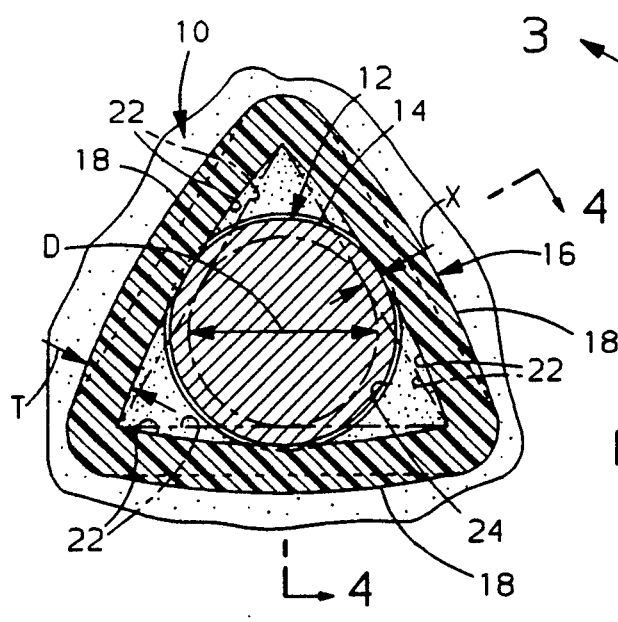
FIG. 3 is a view taken along the line 3—3 in FIG. 2.
Figure 4:
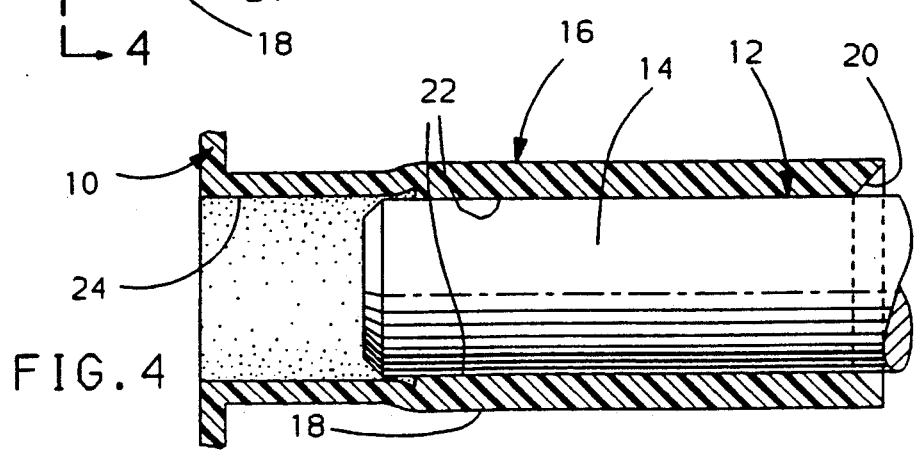
FIG. 4 is a view taken along the line 4—4 in FIG. 3.

As best seen in FIGS. 3 and 4, the hub 16 has a plurality of contiguous flat side walls 18 of uniform thickness T defining a hollow polygon cross section for receiving the cylindrical spindle end with an interfering or press fit. Preferably, there are three walls 18 so as to define an equilateral triangular shaped hub cross section as shown in FIG. 3 encompassing a central cylindrical open space traced by a diameter D slightly smaller than that of the spindle end. The hub has a chamfer 20 at its rear end to lead the spindle end into engagement with the interior side 22 of the hub walls. The hub walls have a thickness and a radial relationship with the spindle end so that the walls are deflected radially outward only a predetermined amount X on insertion of the spindle end in the hub as shown in FIG. 3. Moreover, as shown in FIG. 4, the hub has an enlarged hole or bore 24 at its end opposite the chamfer that is larger in diameter than the spindle end to provide the walls 18 with a fixed axial relationship as well with the spindle end when the spindle end is by design pressed into the hub beyond the depth of these walls.

Given the strength of the hub material, the thickness of the walls 18 and both their axial and radial relationship to the spindle diameter are selected to produce that deflection X that limits the assembly force necessary to effect their press fit to an acceptable level that is not harmful to the speedometer's spindle support structure yet provides a sufficient torque capacity in the press fit to adequately connect the pointer to the spindle. As to the axial relationship, this is the limited axial extent of the walls 18 which acts to limit the amount of press fit contact area between the hub and spindle and thereby the assembly force regardless of the depth of spindle penetration past the depth of these walls.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally and equitably entitled.

I claim:

1. In combination, an instrument pointer, a spindle having a cylindrical end, a hub fixed to said pointer, said hub having a plurality of contiguous flat internal side walls of substantial length parallel to a line central of the hub defining a hollow cross section for receiving said spindle end, said walls having a thickness and both an axial and radial relationship with said spindle end so that said walls are uniformly deflected radially outward along their entire length to only a predetermined amount on insertion of said spindle end to a predetermined depth in said hub extending past and clear of said walls to thereby limit the force required to press said hub on said spindle end while said walls also cooperate to retain said hub on said spindle end with a predetermined press fit.

2. In combination, an instrument pointer, a spindle having a cylindrical end, a hub fixed to said pointer, said hub having a plurality of contiguous flat side walls of uniform thickness and substantial length parallel to a line central of the hub defining a hollow equilateral cross section for receiving said spindle end, said walls having a thickness and both an axial and radial relationship with said spindle end so that said walls are uniformly deflected radially outward along their entire length to only a predetermined amount on insertion of said spindle end to a predetermined depth in said hub extending past and clear of said walls to thereby limit the force required to press said hub on said spindle end while said walls also cooperate to retain said hub on said spindle end with a predetermined press fit.

3. In combination, an instrument pointer, a spindle having a cylindrical end, a hub fixed to said pointer, said hub having three contiguous flat side walls of uniform thickness and substantial length parallel to a line central of the hub defining a hollow equilateral triangular shaped cross section for receiving said spindle end, said walls having a thickness and both an axial and radial relationship with said spindle end so that said walls are uniformly deflected radially outward along their entire length to only a predetermined amount on insertion of said spindle end to a predetermined depth in said hub extending past and clear of said walls to thereby limit the force required to press said hub on said spindle end while said walls also cooperate to retain said hub on said spindle end with a predetermined press fit.

* * * * *